(12) United States Patent
Shah et al.

(10) Patent No.: US 9,084,091 B2
(45) Date of Patent: Jul. 14, 2015

(54) REGISTRATION AND DATA EXCHANGE USING PROXY GATEWAY

(75) Inventors: Kunal Pankaj Shah, Redwood City, CA (US); Jay Ramasastry, Reno, NV (US); Aditi Dubey, Redwood City, CA (US)

(73) Assignee: SILVER SPRING NETWORKS, INC., Redwood City, CA (US)

( * ) Notice: Subject to any disclaimer, the term of this patent is extended or adjusted under 35 U.S.C. 154(b) by 375 days.

(21) Appl. No.: 13/298,891

(22) Filed: Nov. 17, 2011

(65) Prior Publication Data

US 2013/0128894 A1    May 23, 2013

(51) Int. Cl.
*H04W 4/06* (2009.01)
*H04W 8/10* (2009.01)
*H04W 40/02* (2009.01)
*H04W 40/32* (2009.01)
*H04W 84/18* (2009.01)

(52) U.S. Cl.
CPC .... *H04W 4/06* (2013.01); *H04W 8/10* (2013.01); *H04W 40/02* (2013.01); *H04W 40/32* (2013.01); *H04W 84/18* (2013.01)

(58) Field of Classification Search
None
See application file for complete search history.

(56) References Cited

U.S. PATENT DOCUMENTS

| 8,054,780 | B1 * | 11/2011 | Manroa et al. | 370/338 |
| 2007/0121529 | A1 * | 5/2007 | Meier | 370/256 |
| 2008/0187001 | A1 * | 8/2008 | Vaswani et al. | 370/338 |
| 2010/0020699 | A1 * | 1/2010 | On | 370/338 |
| 2010/0037293 | A1 * | 2/2010 | StJohns et al. | 726/2 |
| 2010/0061292 | A1 * | 3/2010 | Weinstein | 370/315 |
| 2012/0008567 | A1 * | 1/2012 | Eisl et al. | 370/329 |

* cited by examiner

*Primary Examiner* — Chirag Shah
*Assistant Examiner* — Joshua Smith
(74) *Attorney, Agent, or Firm* — Buchanan Ingersoll & Rooney PC

(57) ABSTRACT

A system and method is presented for broadcasting from a utility node a request for network routing information, receiving at the utility node routing information from neighboring utility nodes in response to the broadcast request, and registering the utility node with an access point that provides ingress and egress to and from the network. A node is selected to function as a proxy gateway for one or more other nodes in the network. A new utility node becomes connected to one or more utility networks by registering with the proxy gateway. The proxy gateway transmits registration requests and registration information from each node to a back office server and/or a Domain Name Server via an access point for which the proxy gateway functions as its proxy.

13 Claims, 5 Drawing Sheets

REGISTRATION AND DATA EXCHANGE USING PROXY GATEWAY

FIELD OF THE INVENTION

The present disclosure relates generally to the discovery and configuration of ad hoc or mesh networks using node registration. The disclosure more specifically addresses the use of proxy gateways in the registration of nodes and/or management of communications within an ad hoc network. In one implementation, the disclosed subject matter pertains to communication networks for utilities.

BACKGROUND OF THE INVENTION

An Advanced Metering Infrastructure (AMI) network provides services and capabilities to monitor and report the usage or consumption of a commodity, such as water, electricity, gas, etc. Such systems provide communication between a commodity meter and one or more back office systems to report, bill, and otherwise administer the system for managing the distribution of the commodity. Commodity metering information, as well as other information, is typically transmitted by network communication devices, associated with the meters, to the reporting and billing systems. The combination of the meter and the network communication device constitutes one type of node in a utility network.

In an exemplary implementation, the collection and reporting of commodity metering information may only proceed after the registration of a utility node within the AMI network. When a new node powers on, it must establish communication and register its presence in the AMI network with one or more gateways, or access points, that manage the network of nodes, and maintain connectivity with utility servers. As may be understood, the AMI network may consist of thousands or even millions of nodes. The registration process for nodes in such a network may consume a large portion of the available bandwidth, constraining the flow of traffic within the network.

SUMMARY OF THE INVENTION

In accordance with the present disclosure, the traffic flow and bandwidth capacity within an AMI network may be better managed through the use of proxy gateways that collect necessary identification information from the nodes and implement node registration on behalf of the network gateways, and that relay this registration information for nodes to one or more gateways, or Access Points (AP), and a Domain Name Server (DNS) managing communication within the AMI Network. To effect this functionality, an AP or a Back Office Server (BOS) within the network selects one or more network nodes that are currently registered with the AP or BOS to function as proxies for the AP or BOS, hereinafter "proxy gateway nodes." The proxy gateway nodes are interposed between a designated portion of the AMI network, identified as a sub-network, and the AP or BOS. One of the functions of the proxy gateway nodes is to reduce communication traffic in the network by communicating with and collecting registration information from new nodes within the sub-network assigned to the proxy gateway node, and forward this registration information to an AP and/or BOS in a batch mode. Other functions may include disseminating a request from a back office system to individual nodes, and sending the responses from the nodes to the back office system in a batch. The proxy gateway node may also act as a seed node for the propagation of firmware and software updates to other nodes.

For example, when a new node within a sub-network powers up, it sends a broadcast message to neighboring nodes, requesting network routing information to any gateway with which the neighboring nodes may be in communication. Each neighboring node returns network routing information for establishing a communication pathway with one or more associated proxy gateways. Upon receipt of the network routing information from the neighboring nodes, the new node may determine the proxy gateway that requires the lowest communication routing cost to reach that proxy gateway. The new node then sends a registration request and registration information to the identified proxy gateway.

The proxy gateway communicates the registration requests and registration information from new nodes to the AP and/or a DNS server. The proxy gateway may accumulate more than one request and assemble a batch request prior to communicating with the AP or DNS server in order to reduce communication traffic within the network. In this manner, the segmentation of the AMI network into sub-networks, each with an identified proxy gateway, minimizes network traffic congestion caused by the registration of new nodes, by utilizing the proxy gateways as intermediaries for the transmission of registration requests and registration information from new nodes to the AP or DNS server.

Any node that is joining the network and seeking routing and registration information from neighbor nodes may be required to register via a proxy gateway node. When replying to a request for routing information by a new node, the proxy gateway node conveys its identity to the requesting node. In selecting a node to forward its traffic to the network access points for egress, the requesting node may be configured to give priority to a proxy gateway node.

BRIEF DESCRIPTION OF THE DRAWINGS

The foregoing aspects and attendant advantages of the invention will become more readily appreciated and better understood by reference to the following detailed description, when taken in conjunction with the accompanying drawings, wherein.

DETAILED DESCRIPTION

The disclosure herein describes mechanisms in the context of a system for remotely reading, controlling and managing electronic devices in a utility network. The present disclosure is applicable to other systems for network-based management of electronic devices. The exemplary embodiments below provide for a network-based system and method of monitoring and controlling a utility meter in a utility network.

Figure 1:
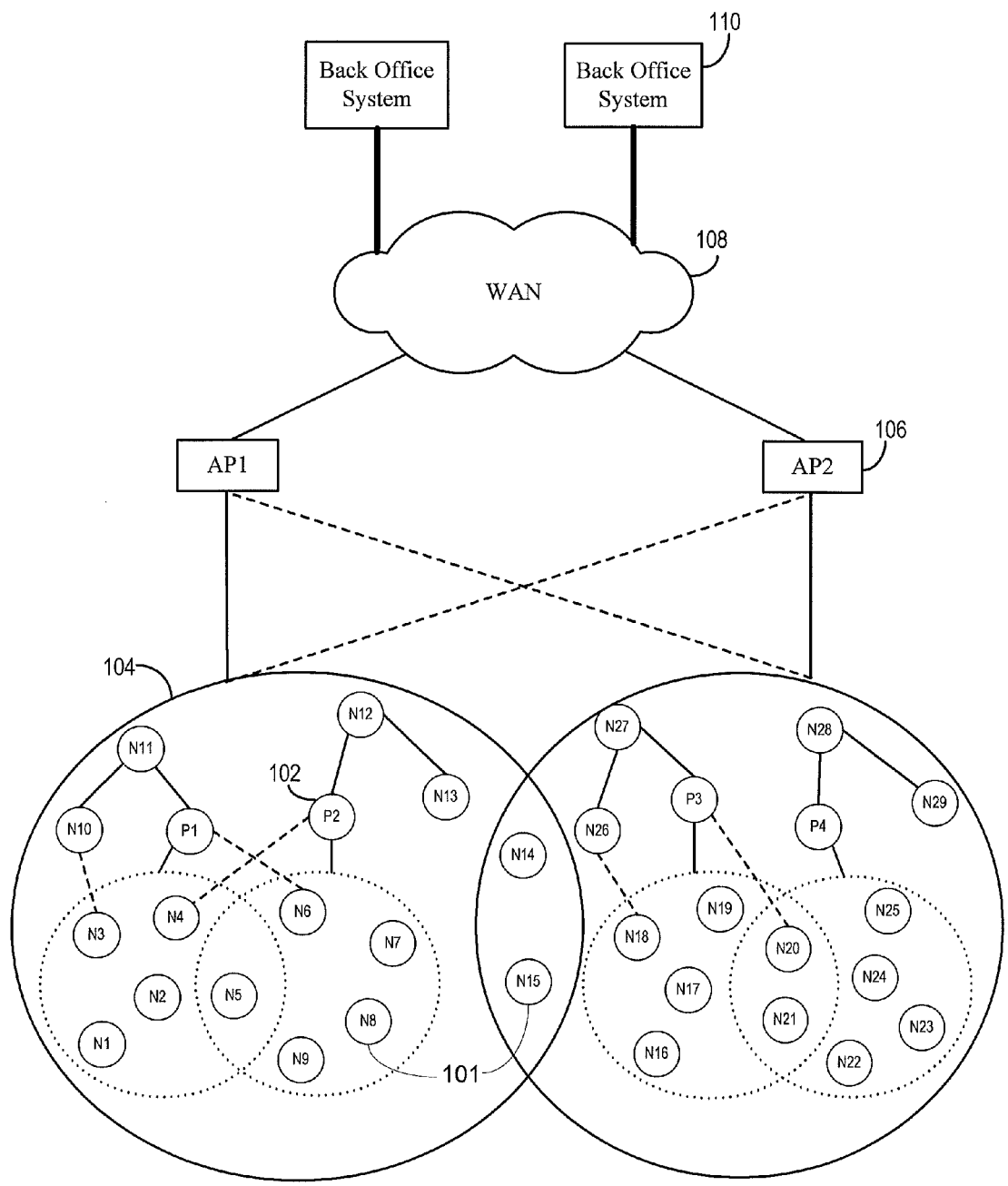
FIG. 1 is a generalized diagram of a utility network and corresponding sub-networks according to an exemplary embodiment.

FIG. 1 is a generalized diagram of a utility network that may be used to implement embodiments of the present disclosure. The utility network may include one or more electronic devices configured as nodes 101 in the utility network. In a preferred embodiment, the nodes 101 may be interconnected within a Local Area Network (LAN) 104 that is associated with an access point 106 that provides egress into and out of the LAN. The Local Area Network can be wireless, wired, or some combination of the two.

In the example of a utility network, the LAN 104 may correspond to a neighborhood or service area for the utility. In the exemplary embodiment, multiple LANs may be present. As illustrated in FIG. 1, for example, a first LAN is associated with one access point AP1 and a second LAN is associated with a second access point AP2. When multiple LANS are present, they may or may not overlap, such that a given node 101 may be connected to, or be a part of, only one LAN or multiple LANs.

The utility nodes may be any type of electronic devices that can be configured as a utility node, which may include a utility meter or may connect to a utility meter. A utility meter is a device which is capable of measuring a metered quantity, typically a commodity such as electricity, water, natural gas, etc. Utility nodes which connect to a utility meter may include a network interface card (NIC) having a processor that executes software and/or firmware to communicate over the LAN in accordance with the procedures described hereinafter. The nodes within a LAN may communicate through the use of one or more RF transceivers to establish wireless connectivity in the LAN 104, and to establish multiple wireless sub-networks. Relay nodes may be used to provide connectivity between the meter-based nodes 101 and other nodes in the wireless LAN 104. Unless otherwise noted, other devices in the network such as electronic devices, gateways, etc. may also function as relays, and relays may perform the functions of other devices or software on the network.

A wireless LAN 104 may be any type of wireless network, and may use any frequency, communications channel or communications protocol.

Generally, as each node 101 powers up, or reboots, it discovers a path to an access point (AP) 106 and registers with that AP, to obtain egress out of the subnetwork. The AP has a unique address prefix, which it assigns to the registering nodes. The node appends identifying information, e.g. its MAC address, to the prefix, to generate a network address. In essence, a LAN 104 is defined by all of the nodes that register with a given AP, since they all have the same network address prefix and can employ that AP to communicate with other networks.

A given node 101 may be registered with a single AP or may be registered with two or more APs. For instance, in the example of FIG. 1, nodes N14 and N15 are each registered with AP1 and AP2, and therefore are members of two LANs. Each of these nodes has two network addresses with different prefixes that are respectively associated with AP1 and AP2.

The access points 106 may be connected to one or more Wide Area Networks (WAN) 108. The WANs 108 may be connected to one or more back office systems (BOS) 110. The back office system may handle a variety of business or management tasks, including participation in the collection of metering information, managing metering devices, security for the network, or other functions as may be desired in an AMI network.

Utility nodes within the communications network may communicate using one or more protocols. Utility nodes may include an electronic device, a relay, an access point, a router, or a BOS. Utility nodes may be able to communicate using an Internet protocol, such as IPv6 or IPv4, for example. Alternatively, some utility nodes may be capable of using both IPv6 and IPv4, may encapsulate IPv6 within an IPv4 packet, or may be capable of tunneling an IPv4 packet through an IPv6 network.

It can be appreciated that, for a large network, such as a utility network in a metropolitan area, individual registration of the nodes 101 with one or more APs can result in a significant amount of network traffic, leading to inefficiencies. To alleviate the congestion, some of the nodes can be designated to function as proxies for the APs, for purposes of registration and route advertisements. These designated nodes are hereinafter referred to as "proxy gateways." In the exemplary embodiment of FIG. 1, the proxy gateways 102 are indicated by the labels P1-P4.

Figure 2:
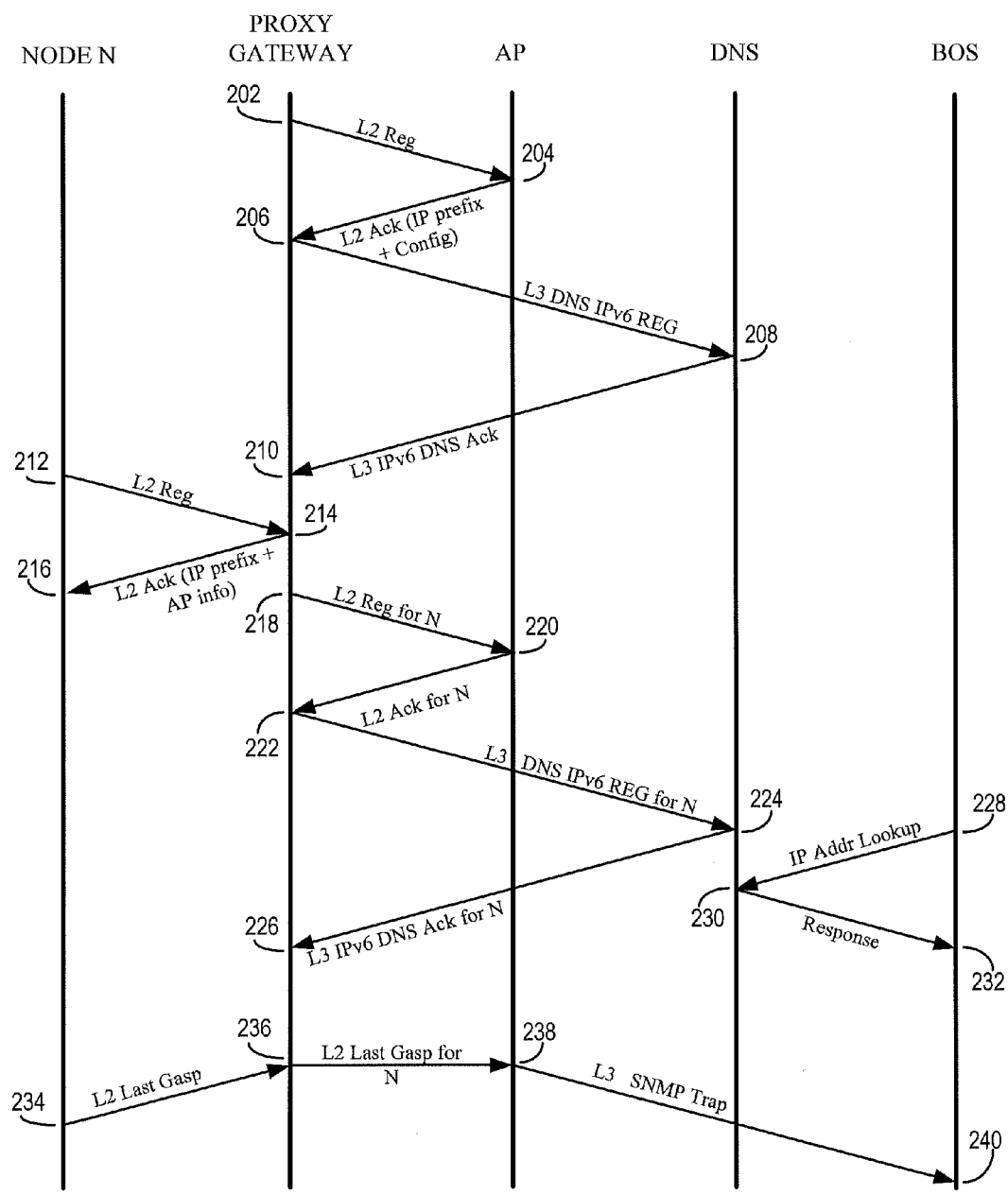
FIG. 2 is a generalized communications flow diagram illustrating the registration of a node within the network according to an exemplary embodiment.

FIG. 2 is a generalized communications flow diagram illustrating the process for registering a node 101 with an access point through an intermediary proxy gateway. Registering a node to obtain a network address may apply to any format or protocol of network addresses. In the exemplary implementation presented, the LAN may employ the IPv6 protocol. In a preferred embodiment, an access point designates one or more nodes as proxy gateways for that access point. In an alternative embodiment, the BOS may be the originator of the designation of proxy gateway status to one or more nodes. The designation may be based on the number of neighboring nodes with which the chosen node can directly communicate, geographic distribution across the subnetwork, and/or quality of its communication links with it neighbors, for example.

Whether originating from an access point or the BOS, the designated node is provided with information that enables it to administer the registration procedure within the sub-network of which the proxy gateway is a member. Such information may include the address prefix that is associated with the designating AP, as well as routing information to enable the designated proxy gateway node to communicate with the AP most efficiently. In addition, the designating AP may establish the maximum number of nodes that a designated proxy gateway node can register, to avoid overloading the designated node.

Further, several other functions that an AP or BOS normally performs (for example: security authentication, special assignments during network outages, etc.) may also be delegated to the proxy gateways. One advantage in doing so is to lower the load on the APs of the network and also to speed up the network administration process. The administration of the addresses includes the collection of registration requests and registration information from newly operational nodes, the assignment of a network address to the new node, and the relay of communications between the new node and the access point or BOS. The proxy gateway node may also disseminate requests from the BOS, such as meter-read requests, to the nodes, bundle commodity measurement data provided by individual meters, and forward that data on to the BOS in a batch mode of communication, and/or function as a seed node for propagating firmware and other software updates to the nodes.

At step 202 a node sends a MAC layer (layer 2 as defined in the OSI 7 layer network model) registration message to an AP. At step 204 the AP responds with a layer 2 acknowledgement message including an IPv6 address prefix that is associated with the AP. In addition, the acknowledgement message may include configuration information that allows the node to register with a DNS server. In an exemplary embodiment, if that node is designated to be a proxy gateway, the configuration information may include information that will permit the node to serve as a proxy gateway for one or more other nodes, as described previously. At step 206, the designated proxy gateway node receives the layer 2 acknowledgement and sends a network layer, or layer 3, IPv6 registration message to a DNS. In the exemplary embodiment, the IPv6 registration message to the DNS includes the IPv6 address for the proxy gateway, which utilizes the IPv6 prefix received from the AP and a unique IPv6 "suffix", to complete an IPv6 address for the proxy gateway. These steps are performed in a manner consistent with stateless autoconfiguration steps of RFC 2462. In an exemplary embodiment, the IPv6 suffix is based upon the MAC address of the proxy gateway node. However, alternative embodiments may use suffixes not based upon the MAC address to create a unique IPv6 address for the proxy gateway node.

At step 208, the DNS sends a layer 3 acknowledgement message to the proxy gateway, which may serve as the acknowledgement message for the registration of the proxy gateway node with the DNS. The proxy gateway node receives the acknowledgement message at step 210. The prefix information communicated to the proxy gateway node may include an indication that the prefix for the IPv6 address registered with the DNS may identify a subnetwork of nodes that will be managed by the proxy gateway node now registered with the DNS.

In an exemplary embodiment, a new node N that powers up within the network seeks to register with the network. To do so, the node sends a broadcast message to its neighboring nodes, i.e. those nodes with which it is able to directly communicate. In response to the broadcast message, the neighboring nodes provide information on how to reach at least one proxy gateway node. For instance, in the example of FIG. 1, there are two proxy gateways P1 and P2 within the LAN 102. The new node calculates transmission costs based on the information obtained from its neighboring nodes, and identifies the proxy gateway node having the lowest cost route to it. After the least cost proxy gateway node has been determined, at step 212 the new node sends a layer 2 registration message to the identified proxy gateway node. The proxy gateway node receives the layer 2 registration request from the new node N. At step 214, the proxy gateway node sends a layer 2 acknowledgement message to node N. In the exemplary embodiment, in addition to the acknowledgement, the proxy gateway node sends the IPv6 prefix information for the LAN with which node N will be associated, and AP information with which node N will be in communication. Node N receives the acknowledgement, IPv6 prefix, and AP information at step 216.

At step 218, the proxy gateway node sends a layer 2 registration message for node N to the AP. In an additional exemplary embodiment, the proxy gateway may collect registration requests and registration information for more than one node within the associated subnetwork of nodes for which the proxy gateway has been assigned management responsibility. In FIG. 1, the individual subnetwork associated with each proxy gateway is indicated by a dashed circle. The proxy gateway can subsequently transmit the collected requests and information as a batch within the layer 2 registration message being sent to the AP. The AP receives the layer 2 registration message and stores the node registration information. The proxy gateway transmits the IPv6 address for each registering node in this message to the AP. The AP transmits a layer 2 acknowledgement message for the node, or nodes, at step 220 to the proxy gateway. At this point, the AP and proxy gateway are aware of the node N and the registration information for node N has been communicated to the AP.

At step 222, the proxy gateway sends a layer 3 message to the DNS to communicate the assigned IPv6 registration address for node N to the DNS. In an additional embodiment, the proxy gateway may send a layer 3 message to the DNS containing a batch of registered IPv6 addresses for more than one node. At step 224, the DNS sends a layer 3 DNS acknowledgement message acknowledging the assigned IPv6 address (es) for node N, or for the batch of nodes identified within a batch layer 3 message. The proxy gateway receives the layer 3 DNS acknowledgement message at step 226.

The BOS may request the network address of a given node at any time. In an exemplary implementation, the BOS may request the network address of node N by performing a lookup with the DNS server. At step 228 the BOS sends an IPv6 network address lookup message for the node N. At step 230 the DNS server responds to the BOS with an IPv6 address for node N. The IPv6 address for node N is received in the response message from the DNS to the BOS at step 232.

In the event node N encounters a problem, for example loss of power, a security incident, a problem with its hardware or software, a network problem, etc., node N may send a message indicating a problem to the BOS. In the event of a loss of power, the node N may send a "last gasp" message to indicate that condition. At step 234 node N sends a last gasp message to the proxy gateway, either directly or via its neighboring nodes. The proxy gateway constructs a last gasp message for node N and sends this message to the AP at step 236. At step 238 the AP packs an SNMP TRAP with layer 2"last gasp" messages and forwards them to the BOS which indicates the AP has received a last gasp message from node N. The BOS receives the layer 3 SNMP trap message containing the last gasp message from node N at step 240.

Figure 3:
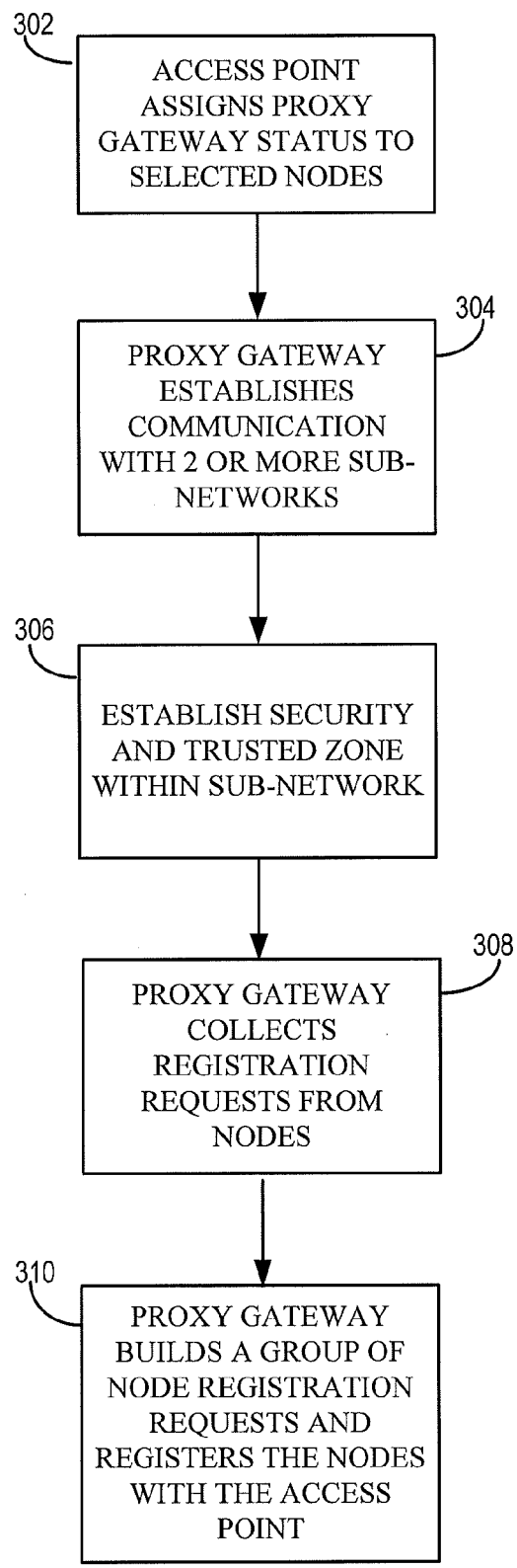
FIG. 3 is a generalized flow chart for the registration of a node with an Access Point according to an exemplary embodiment.

FIG. 3 presents a generalized communications chart illustrating the registration of a node within the network. At step 302, the AP determines one or more nodes to designate as proxy gateways for the AP. The designation of proxy gateway nodes may be a dynamic process that is performed over multiple iterations. At the outset, certain nodes may be designated as proxy gateway nodes based on factors such as number of direct neighbor nodes and geographic dispersion. Later, as more nodes join the subnetwork and more information becomes available about the quality of communication links, the designation of proxy gateway nodes may be reconfigured to take this new information into account, as well as to balance loads between designated proxy gateway nodes and optimize traffic flow.

Any node in the network may be designated as a proxy gateway by the AP. Upon the designation as a proxy gateway, the AP transmits the appropriate information that enables the proxy gateway node to serve as the registration manager.

At step 304 the proxy gateway may establish data communication with the nodes in two or more sub-networks to provide alternate network communication pathways for its subnetwork of nodes. In the event of a network error or other event that causes one or more proxy gateways to lose communication with a subnetwork for which the proxy gateway has management responsibility, an alternate proxy gateway may assume the management and communication tasks for the subnetwork.

At step 306, to establish and maintain data communication security, a subnetwork established by a proxy gateway may be designated as a trusted zone. In a trusted zone, each node will be able to establish a network route with the nodes within the same zone, but not with other zones. The nodes within the trusted zone subnetwork are aware of the nodes in zones outside of the trusted zone. However, the nodes in a trusted zone do not establish a network communication route to a node outside of the trusted zone unless the node in the trusted zone is not able to find a neighbor in the same trusted zone, so as to establish communication with a proxy gateway for registration and network communication tasks.

In one embodiment, a proxy gateway node can function as a certification authority. For instance, as disclosed in U.S. patent application Ser. No. 12/187,354, the disclosure of which is incorporated herein by reference, each node is assigned a device certificate (referred to as its "birth certificate") and a manufacturing certificate that are provided during the manufacturing process. A node seeking to join the network exchanges birth certificates with another node that is already enrolled in the network. Once each node has validated the other's birth certificate, the requesting node attains a first level of trust, and sends a request to an AP for a driver's license associated with a higher level of trust. The AP may obtain the driver's license from the BOS during the authentication process between the AP and BOS. Each AP has an assigned operator certificate and a Driver's License Certification Authority (DLCA) certificate (which is unique for each utility). Once the AP receives a driver's license from the BOS, it advertises its ability to issue driver's licenses to all authorized nodes of the network. A proxy gateway node can be used to implement some of the functionality associated with the driver's licenses. For example, the proxy node can advertise an ability to issue driver's licenses. When a new node is powered on, validates the birth certificates to obtain the first level of trust and requests a driver's license, the proxy gateway can authenticate each new node as a member of the sub-network and assign a driver's license to the new node (instead of AP sending it to all nodes). The proxy gateway then transmits the driver's license to the new node, along with its enrollment status. In this implementation, the proxy node securely stores the credentials for signing and issuing driver's licenses.

At step 308, the proxy gateway communicates with the nodes in the subnetwork as an intermediary between the nodes and the AP. At step 310, the proxy gateway registers the new nodes and communicates the registration information to the AP, thereby registering the new nodes with the AP. In an alternative implementation, the proxy gateway may gather the registration requests and registration information for more than one node, and communicate with the AP registering multiple nodes in a single communication with the AP.

In addition to nodes 101 such as those affiliated with meters, Distribution Automation (DA) devices may be registered within the network. DA devices may register through a battery-backed device acting as a proxy gateway and in communication with the network. Alternatively, a proxy gateway may be designated that may be in communication with battery backed devices such that the proxy gateway will serve as an intermediary between the battery backed devices, through which the DA devices communicate, and an AP. In this fashion, both IP-capable nodes and DA nodes may register with the network through a designated proxy gateway.

Figure 4:
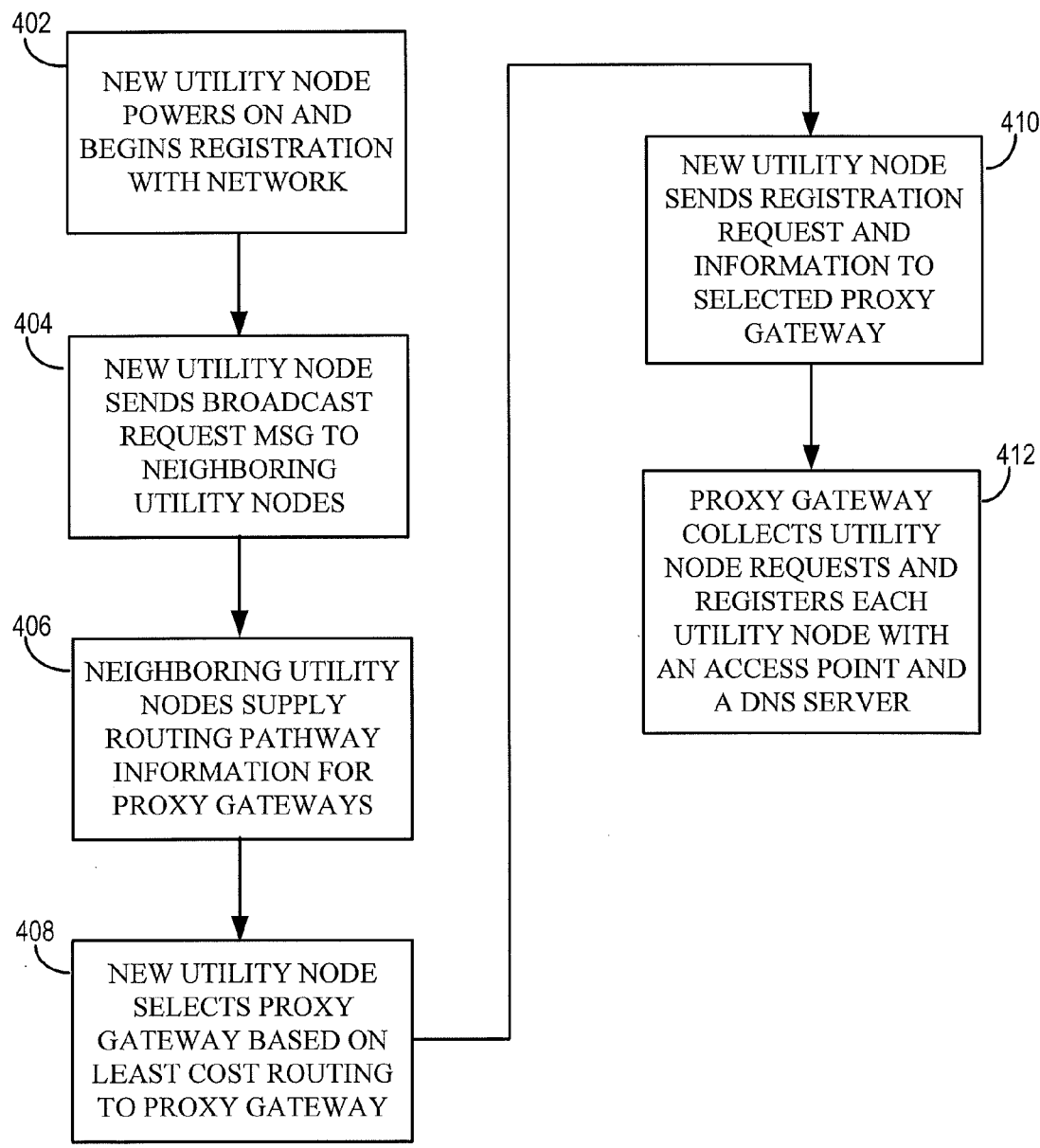
FIG. 4 is a generalized flow chart for the registration of a new node with a proxy gateway according to an exemplary embodiment.

FIG. 4 presents a generalized flow chart for the registration of a new node, such as a utility node, with a proxy gateway in accordance with an exemplary implementation. At step 402, when a new node powers up within the subnetwork of nodes managed by the proxy gateway, the new node must first register with the network to establish communication with the network. At step 404, the new node broadcasts a request message to all neighboring nodes that are within broadcast range of the new node, requesting network route path information to one or more APs with which the neighboring nodes are registered. At step 406, the neighboring nodes respond to the broadcast message by providing network route pathway information for one or more proxy gateways. At step 408, upon receipt of the routing information from the neighboring nodes, the new node performs a least cost routing calculation from itself to each proxy gateway for which the new node has received network route pathway information. Least cost routing calculations are known in the art and the new node may perform such calculations in accordance with any calculation method that will identify the proxy gateway having lowest cost to reach that proxy gateway. At step 410, the new node sends a registration request and registration information to the proxy gateway identified as the first choice based upon the lowest cost route. The proxy gateway thus selected will receive the registration request from the new node, along with identification information. At step 412, the proxy gateway will assign an IPv6 address prefix to the new node and communicate the registration information to the AP and a DNS server, registering the new node with the AP and the DNS server.

In an alternative implementation, the proxy gateway may gather the registration requests and registration information for more than one node. The proxy gateway may then bundle the registration requests and registration information for more than one node into a batch communication that the proxy gateway sends to the AP in a single batch message, registering all of the nodes in the batch communication with the AP.

Figure 5:
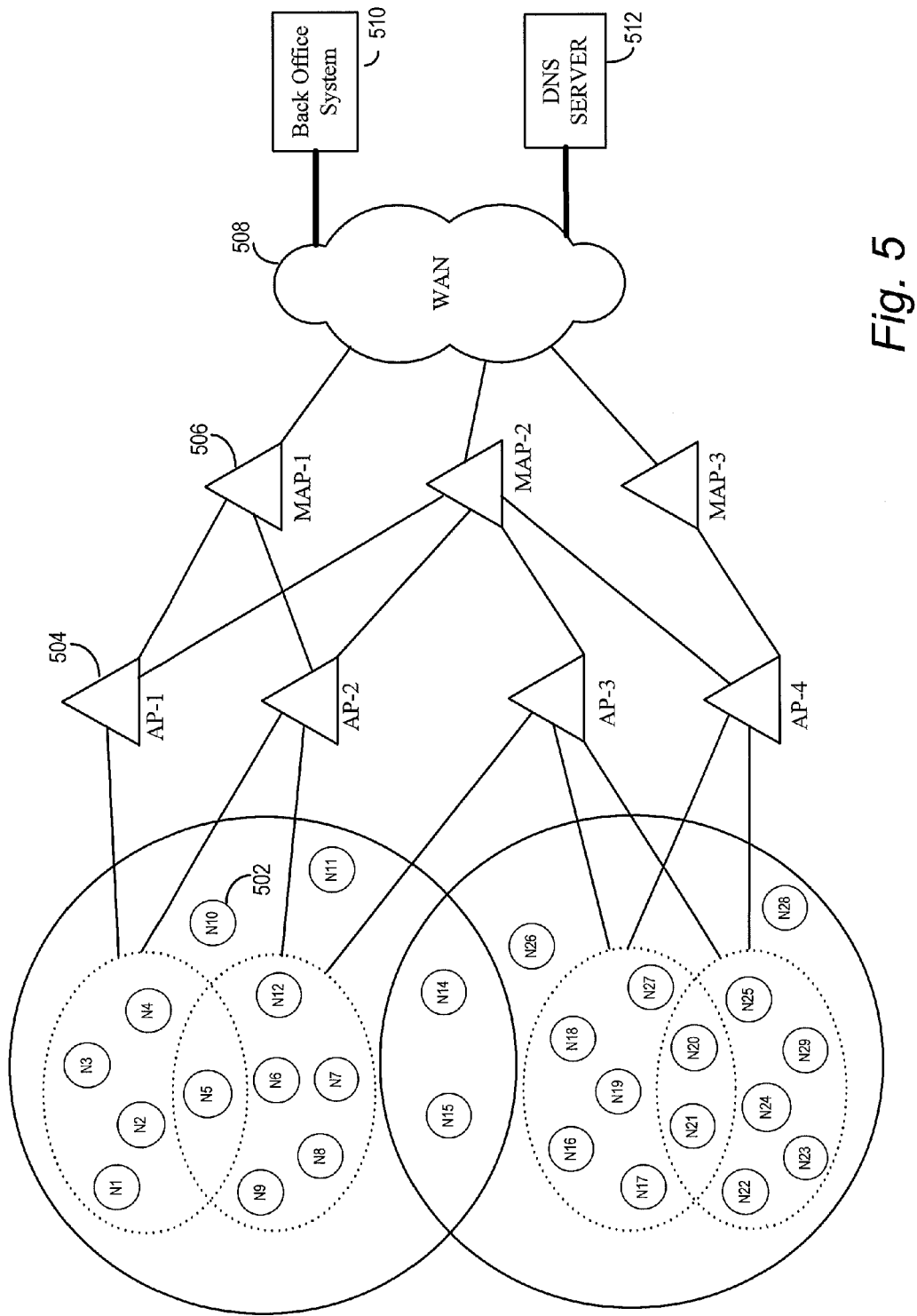
FIGS. 5 is a generalized diagram of a utility data communication network having access points and master access points according to an exemplary embodiment.

FIG. 5 presents a generalized diagram of a utility data communication network having access points and master access points according to an alternative exemplary implementation. In this exemplary implementation network communication is optimized through the use of intermediary devices that intercept and concentrate network communications in a hierarchical fashion so as to optimize the bandwidth use across the network. A node 502, which can be any type of utility node as described above, needs to establish communication across the network to transmit gathered data. The node 502 first establishes a network connection with an AP 504 with which it is registered. This may be accomplished directly, or via a proxy gateway as described previously. The AP 504 serves as an intermediary with the remainder of the network and, as such, the nodes that are in communication with the AP 504 communicate only with the AP 504 at any given time. Each node 502 may, however, register and communicate with more than one AP 504. In this manner, if an access point is down or otherwise unavailable for any reason, due to power issues, network congestion, mechanical failure, or the like, a node 502 may be assured that messages it sends will be received by at least one AP 504 and transmitted to the next layer in the communications hierarchy.

In this exemplary implementation, each AP 504 is in network communication with more than one Master Access Point (MAP) 506. Each AP 504 receives data collected and generated from one or more nodes 502 and concentrates this data into a communication package such as a chunk, which contains all of the data communicated from the nodes to the AP 504 for further transmission. The AP 504 may have a default time period during which it will gather node communications prior to building the chunk and communicating it to the MAP 506. Alternatively, the chunk may be set at a certain size in terms of bytes, in order to maximize the use of the network bandwidth, and the AP 504 may accumulate node data messages until the optimum chunk size has been attained. Upon this event, the AP 504 creates the chunk and transmits this communication stream to a MAP 506 with which it is in contact. For example, the AP may initially send the chunk to a preferred MAP that it selected on the basis of routing costs. If the transmission to that preferred MAP is not successful, e.g. the AP 504 does not receive an acknowledgement from the preferred MAP 506 within a predetermined time period, the AP 504 may retransmit the chunk to an alternative MAP with which it can communicate. In this manner, no chunk will be lost even if one master access point is not in operation and does not receive or resend the chunk.

Upon successful receipt of the chunk message from an AP, a MAP 506 transmits each chunk message across a Wide Area Network (WAN) 508. The chunk messages from the MAP 506 are sent to the BOS 510, so that the BOS 510 may store and utilize the data communication from the nodes and any requests from a node may be answered by the BOS 510 or the DNS Server 512. Responses to queries from a node 502 for data from the BOS 510 or the DNS Server 512 are passed back along the communication hierarchy in reverse. Messages intended for multiple downstream nodes, such as meter read requests, can be sent in chunks as well.

The BOS 510 and DNS Server 512 utilize the WAN 508 to communicate with a MAP 506 from which a chunk was received. The MAP 506 in turn communicates any response to each AP 504 from which it received the node request. The AP 504 in communication with the destination node 502 passes any response message to the node 502. This communication process optimizes the flow of data communication from the nodes 502 to the BOS 510 and DNS Server 512 without requiring that each node contact the BOS 510 or DNS Server 512 directly. The streamlined data communication lowers the bandwidth requirement between the nodes and the BOS 510, for example, by using both APs and MAPs as intermediaries for the concentration and communication of messages from the nodes.

In the preceding exemplary embodiments, the access points function as network management devices, insofar as they maintain registration information for each of the nodes of the network with which they are associated, such as a node identification, the node's network address, and optionally other information regarding the configuration, neighboring nodes, routing paths, etc. of the node. The access points delegate some of the functions associated with the registration of nodes to the proxy gateways, such as the collection of the relevant registration information from the new nodes that are connecting to the network. It will be appreciated that devices other than access points are capable of functioning as network management devices with which nodes register, and employ the benefits of proxy gateways. For instance, a DA device typically registers with a battery-powered device. Such battery-powered devices may employ the services of a proxy gateway node to provide for a more efficient registration procedure.

From the foregoing, therefore, it will be appreciated that the invention can be embodied in a variety of forms, without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for registering a node with an access point that provides an interface for the exchange of information between nodes of a local area network and devices outside of the local area network, comprising:

designating at least one node of the local area network as a proxy for the access point, wherein the designated proxy node is configured to register nodes that are connecting to the local area network, and forward the registrations to the access point;

designating at least one sub-network within the local area network;

designating a trusted zone within the at least one sub-network, wherein a node in the trusted zone does not communicate directly with another node outside of the trusted zone unless the node in the trusted zone is unable to find a neighbor in the same trusted zone;

broadcasting a certificate message from a connecting node that is connecting to the local area network;

receiving a certificate response to the certificate message at the connecting node from a second node that is enrolled in the trusted zone, the certificate response including information pertaining to the designated proxy node and pertaining to a first level of trust;

broadcasting, from the designated proxy node, an advertisement of the designated proxy node's ability to issue certificates that provide a second level of trust within the local area network, the second level of trust being higher than the first level of trust;

receiving, at the designated proxy node, an enrollment request from the connecting node;

upon receipt of the enrollment request at the designated proxy node, generating a certificate associated with the second level of trust, based upon information pertaining to the connecting node that is received with the enrollment request; and transmitting the certificate and an enrollment status from the designated proxy node to the connecting node;

based upon information included in the received certificate and enrollment status, sending a registration request from the connecting node to the designated proxy node;

transmitting a registration acknowledgement from the designated proxy node to the connecting node, the registration acknowledgement including information regarding a network address to be used by the connecting node for communications via the local area network; and transmitting, from the designated proxy node to the access point, a registration message containing information for registering the connecting node with the access point.

2. The method of claim 1, wherein a plurality of nodes that are connecting to the network send respective registration requests to the designated proxy node, and wherein the designated proxy node sends information for each of the plurality of connecting nodes as a batch in said registration message that is transmitted to the access point.

3. The method of claim 1, wherein the designated proxy node also transmits information for registering the connecting node to a domain name server.

4. The method of claim 1, wherein a plurality of nodes are designated as proxies for the access point, and wherein the connecting node receives information pertaining to the plurality of designated proxy nodes in response to the broadcast certificate message, and based upon the received information pertaining to the plurality of designated proxy nodes, selects one of the plurality of designated proxy nodes to which to send the registration request.

5. The method of claim 4, wherein the connecting node calculates a cost to communicate with each of the plurality of designated proxy nodes and, on the basis of the calculated costs, selects the proxy node to which to send the registration request.

6. The method of claim 1, wherein the network is a utility network, and the proxy node is a network node that is affiliated with a utility meter.

7. The method of claim 6, wherein the connecting node is associated with a distribution automation (DA) device.

8. The method of claim 7, wherein the connecting node associated with a DA device is a battery-powered node.

9. The method of claim 1, wherein a plurality of network nodes that register via the designated proxy node constitute the trust zone, in which the nodes in the trust zone establish routing paths to one another and to the designated proxy node, but do not establish routing paths to network nodes outside of the trust zone.

10. A proxy node for a local area network having at least one access point that provides an interface for the exchange of information between nodes of the network and devices outside of the local area network,
 wherein at least one sub-network is designated within the local area network, and a trusted zone is designated within the at least one sub-network, wherein a node in the trust zone does not communicate directly with another node outside of the trusted zone unless the node in the trusted zone is unable to find a neighbor in the same trusted zone,
 wherein a connecting node connecting to the local area network broadcasts a certificate message, and the connecting node receives a certificate response to the certificate message from a second node that is enrolled in the trusted zone, the certificate response including information pertaining to the proxy node and pertaining to a first level of trust, and
 wherein the proxy node is configured to implement the following operations:
 broadcast an advertisement of the proxy node's ability to issue certificates that provide a second level of trust within the local area network, the second level of trust being higher than the first level of trust;
 receive an enrollment request from the connecting node;
 upon receipt of the enrollment request, generating a certificate associated with the second level of trust, based upon information pertaining to the connecting node that is received with the enrollment request;
 transmit the certificate and an enrollment status to the connecting node;
 receive registration requests from the connecting node based upon information included in the certificate and enrollment status transmitted to the connecting node;
 transmit a registration acknowledgement to the connecting node, the registration acknowledgement including information regarding a network address to be used by the connecting node for communications via the network; and
 transmit, to the access point, a registration message containing information about the connecting node, the information in the registration message enabling the access point to register the connecting node.

11. The proxy node of claim 10, wherein the proxy node is configured to transmit a single registration message containing information about each of a plurality of connecting nodes to the access point.

12. The proxy node of claim 10, wherein the proxy node is also configured to transmit information for registering the connecting node to a domain name server.

13. The proxy node of claim 10, wherein the network is a utility network, and the proxy node is a network node that is affiliated with a utility meter.

* * * * *